Sept. 10, 1935.  J. W. BACE  2,013,647
PROPELLER CONSTRUCTION
Filed Oct. 24, 1933   4 Sheets-Sheet 1
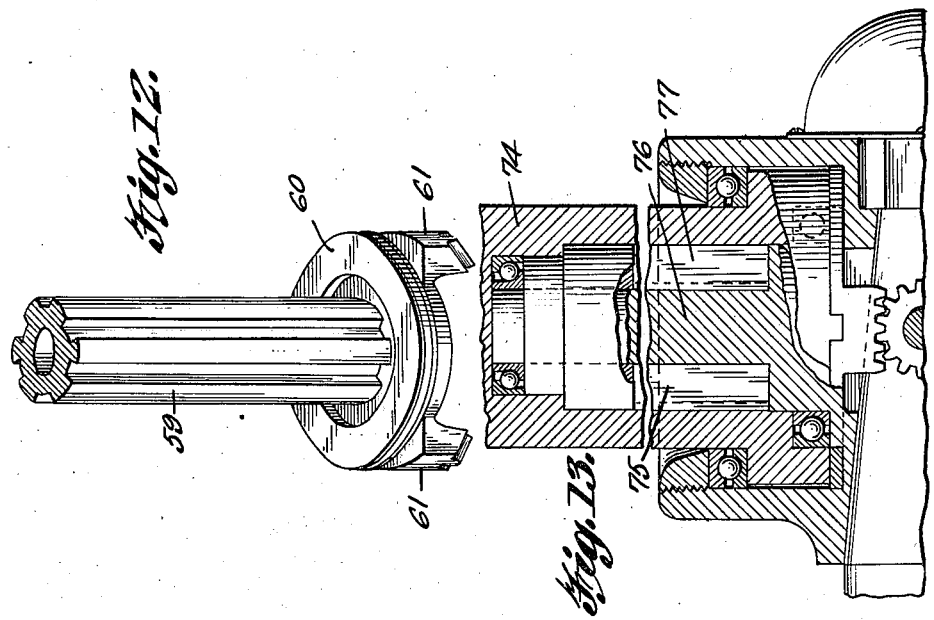
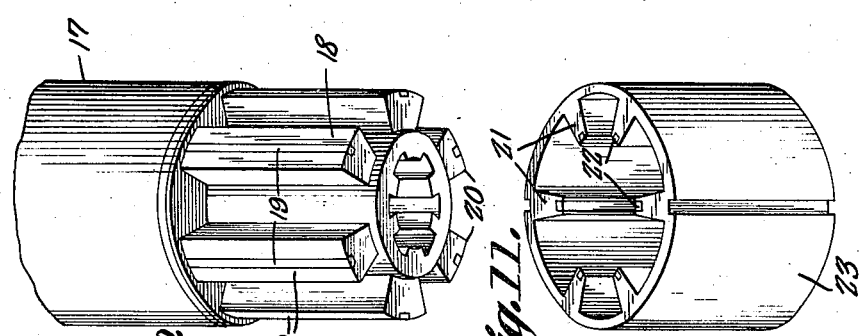
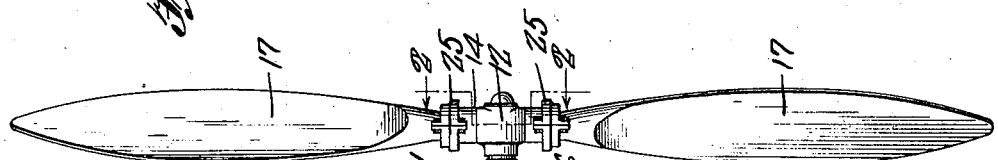
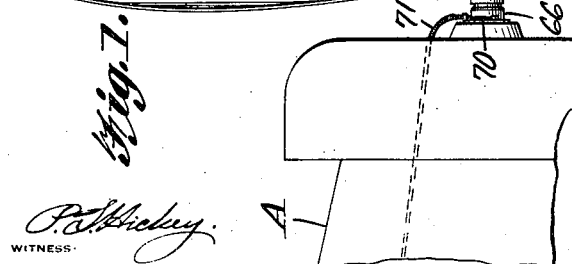
Jess W. Bace,
INVENTOR
BY Victor J. Evans & Co.
ATTORNEY

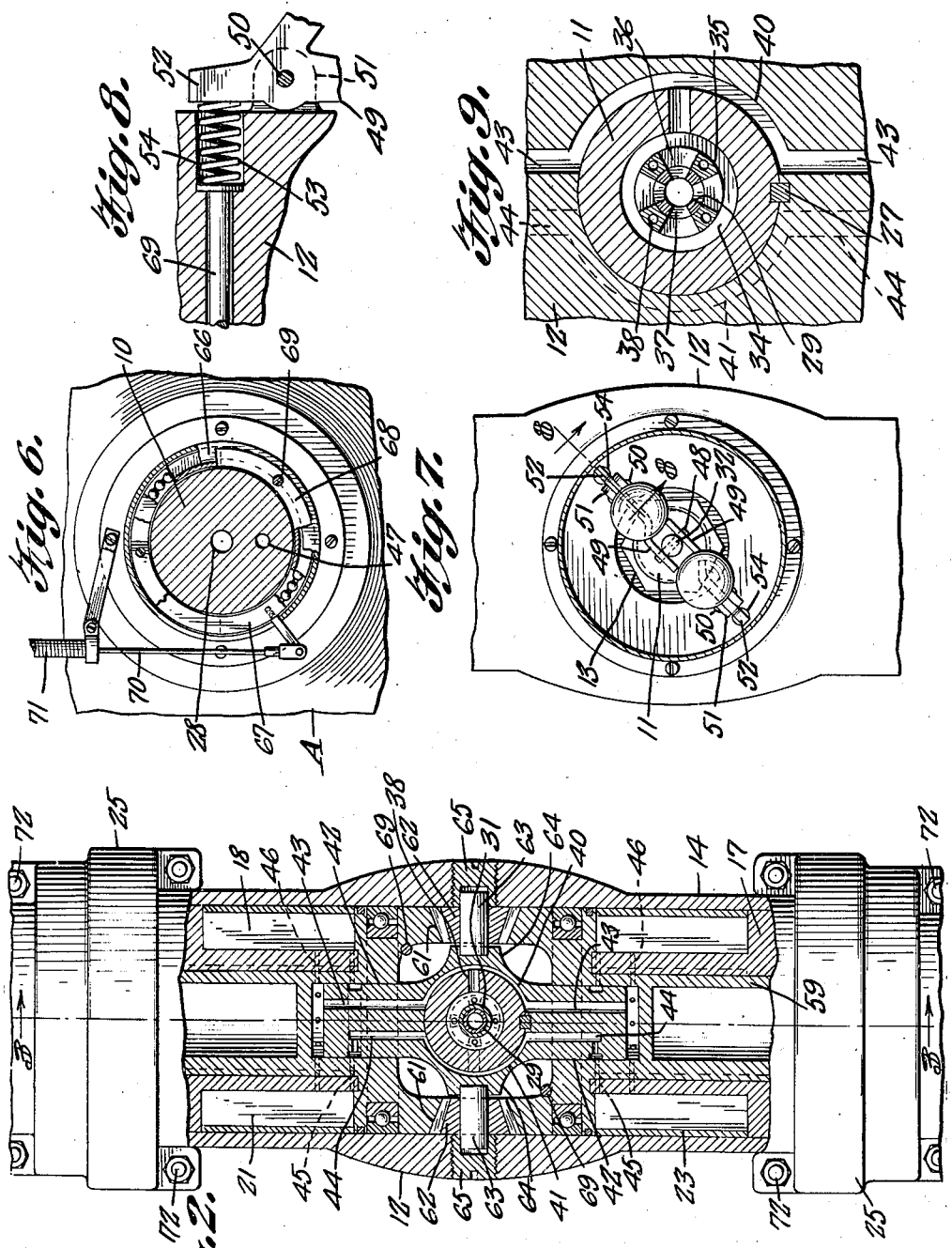

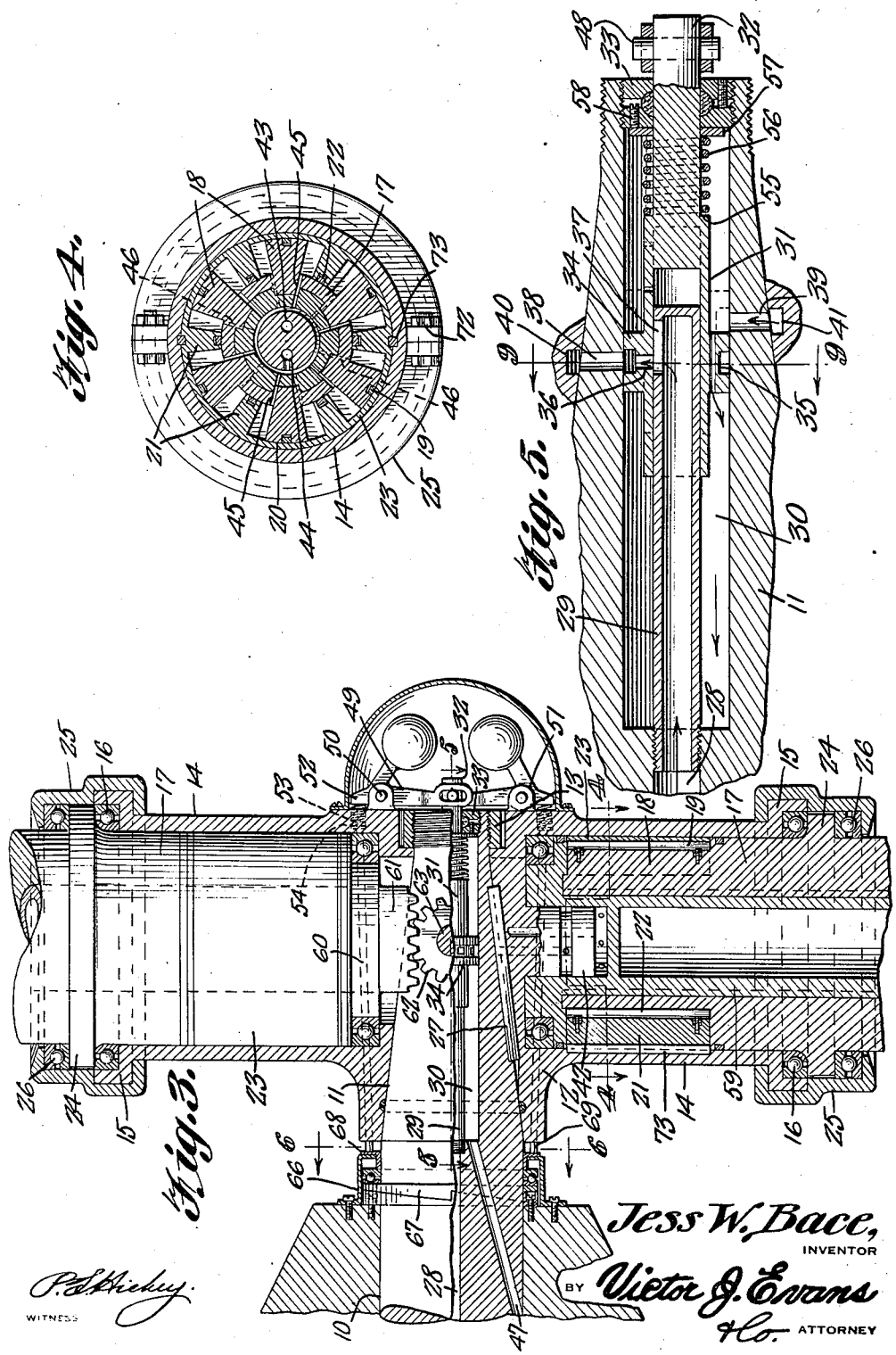

Sept. 10, 1935.    J. W. BACE    2,013,647
PROPELLER CONSTRUCTION
Filed Oct. 24, 1933    4 Sheets-Sheet 4
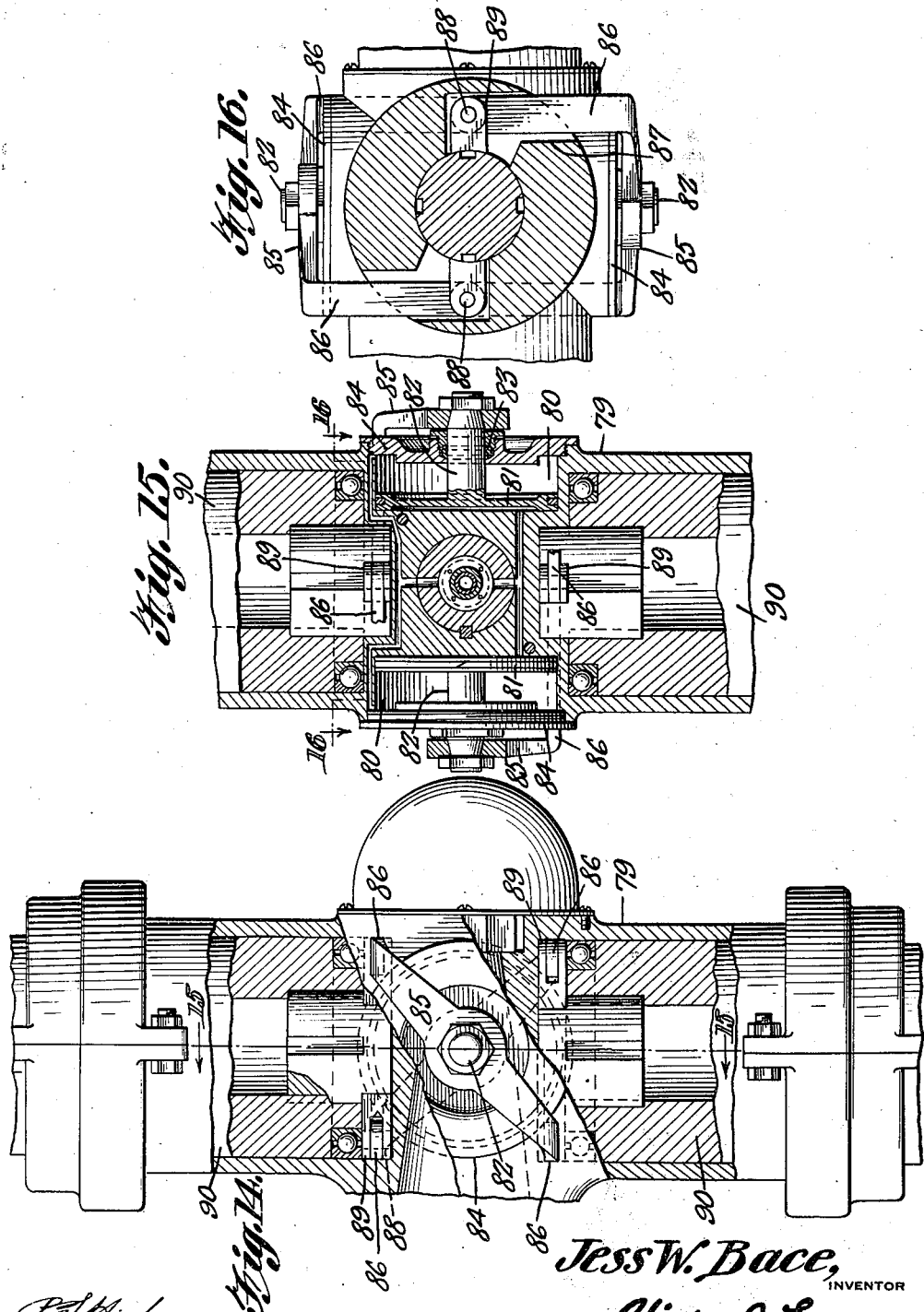

Patented Sept. 10, 1935

2,013,647

UNITED STATES PATENT OFFICE 2,013,647

PROPELLER CONSTRUCTION

Jess W. Bace, Taft, Calif.

Application October 24, 1933, Serial No. 695,041

10 Claims. (Cl. 170—163)

The invention relates to a propeller construction and more especially to control mechanism for varying the pitch of the blades of aircraft propellers.

The primary object of the invention is the provision of mechanism of this character, wherein the blades of a propeller are automatically controlled by fluid so that the pitch of such blades at the desired angle can be had with accuracy according to the speed of the aircraft, the mechanism being of novel construction and the fluid being controlled in a novel manner.

Another object of the invention is the provision of mechanism of this character, wherein the pitch of the blades of the propeller of the aircraft kind can be had and the control thereof is accomplished either manually or mechanically, the latter operating automatically, and a wide range of pitch is provided and the control, either the hand or the automatic, is operative at high, low or intermediate speeds.

A further object of the invention is the provision of mechanism of this character, wherein the blades of the propeller are supported by a hub having contained therein the operative parts for the changing of the pitch of such propeller blades, these parts including fluid impact members influenced by the pressure of fluid under pressure, the fluidity being under positive control, so that the pitch of the blades can be had with accuracy and the positive changing of the angles of said blades for the setting thereof at the proper pitch, irrespective of the speed of travel of the aircraft, the pitch control being advantageous to avoid the racing of the propeller and thus placing a strain upon the motor, particularly when the aircraft changes from a line of draft to a power dive, the mechanism automatically altering the pitch of the blades to change their speed of rotation to maintain normalcy in the working of the motor.

A still further object of the invention is the provision of mechanism of this character, wherein the parts of the same are assembled in a unique manner so as to render such mechanism compact and to avoid increasing the size of the hub of the propeller or in the weight thereof, and in this manner maintaining the standard of the propeller construction and at the same time assuring maximum strength and durability.

A still further object of the invention is the provision of mechanism of this character which is comparatively simple in construction, thoroughly reliable and efficacious in its purposes, strong, possessed of longevity, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a fragmentary side elevation of the nose end of an aircraft showing the propeller constructed in accordance with the invention.

Figure 2 is a fragmentary enlarged sectional view taken on the line 2—2 of Figure 1 looking in the direction of the arrows.

Figure 3 is a sectional view on the line 3—3 of Figure 2 looking in the direction of the arrows.

Figure 4 is a sectional view on the line 4—4 of Figure 3 looking in the direction of the arrows.

Figure 5 is a sectional view on the line 5—5 of Figure 3 looking in the direction of the arrows.

Figure 6 is a sectional view on the line 6—6 of Figure 3 looking in the direction of the arrows.

Figure 7 is an elevation of the governor of said mechanism, the hub cap of the propeller being shown in section.

Figure 8 is a fragmentary sectional view on the line 8—8 of Figure 7 looking in the direction of the arrows.

Figure 9 is a sectional view on the line 9—9 of Figure 5.

Figure 10 is a fragmentary perspective view of one of the propeller blades showing in detail the impact vanes or wings of said mechanism.

Figure 11 is a fragmentary perspective view of the female member for the part shown in Figure 10.

Figure 12 is a fragmentary perspective view of a part of the tracking connection between the blades of said propeller.

Figure 13 is a fragmentary detail sectional view showing the mounting of the part shown in Figure 12 and a modified arrangement of the impact vanes for the pitch control of the blades of the propeller.

Figure 14 is a fragmentary detail sectional view showing a further modified form of pitch control.

Figure 15 is a sectional view on the line 15—15 of Figure 14 looking in the direction of the arrows.

Figure 16 is a sectional view on the line 16—16 of Figure 15 looking in the direction of the arrows.

Similar reference characters indicate corresponding parts throughout the several views in the drawings.

Referring to the drawings in detail, particularly Figures 1 to 10 inclusive, A designates generally a portion of the nose end of an aircraft in which is mounted the power shaft 10 for the propeller having the tapered axle end 11 on which is fitted the hub 12 of the propeller. This hub 12 is retained on the axle end 11 by the retaining nut 13 detachably threaded upon said axle end. At diametrically opposite points the hub 12 is formed with tubular extensions 14 having external annular flanges 15, these providing seats for antifriction bearings 16 as fitted within the outer ends of said extensions 14. Telescoped within these extensions 14 are the inner ends of the blades 17 of the propeller. The inner end of each blade 17 has formed thereon the radially disposed spaced longitudinally directed impact vanes or wings 18 carrying packings 19 at their outer faces 20 which coact with the radially disposed internal vanes or wings 21, these having the packings 22 and formed internally of a cylinder 23, the latter being suitably keyed and snugly fitted in its companion extension 14. These vanes or wings 18 and 21 oppose each other, the vanes or wings 21 being the stationary series while the vanes or wings 18 are the movable series.

Each blade 17, at its inner end portion, is formed with an annular shoulder 24 received in a coupling collar 25, the latter engaging about the shoulder 15 on the extension 14 so that in this manner the blade 17 is rotatably coupled with said extension 14, the collar 25 being fitted with antifriction bearings 26 which, with the bearings 16, take care of end thrust and centrifugal thrust in the working of the propeller.

The hub 12 is made fast with the axle end 11 by a key 27.

The power shaft 10 has formed therein a central fluid inlet passage 28 communicating with an inlet nozzle or barrel 29 extended into an exhaust chamber 30 formed in the axle end 11 concentrically of said nozzle or barrel 29. Telescoped upon the nozzle or barrel 29 is a slide valve 31 having the stem 32 working through a stuffing box 33 mounted in the outer extremity of the axle end 11. The valve 31 is built with an external annular enlargement 34 having a fluid channel or groove 35 communicative by a port 36 with the inlet opening 37 of the nozzle or barrel 29. This fluid channel or groove 35 is also communicative with passages 38 and 39, respectively, formed in the axle end 11 and common to half-circular ways 40 and 41, respectively, formed in the hub 12, the latter being provided with diametrically opposed centering portions 42 having leads 43 and 44, respectively, the latter, through branches 45, communicating with the spaces between the vanes or wings 18 and 21, while the leads 43, through the branches 46, communicate with said spaces between the vanes or wings 18 and 21. The fluid in the branches 45 drives the vanes 18 in one direction and the fluid in the branches 46 drives the said vanes in the reverse direction. The lead 43, when the valve 31 is in one position, constitutes an inlet while the lead 44 constitutes an outlet for the fluid and vice versa. The exhaust of the fluid is had through the chamber 30 to a return 47 of the fluid source.

The stem 32 of the valve 31, outside of the stuffing box 33, carries a cross pin 48 for connection with the arms 49 of a ball governor, these arms being pivoted, at 50, to bearings 51 on the hub 12. The arms 49 carry lugs 52 playing against springs 53 counterseated, at 54, in the hub 12. Surrounding the stem 32 and working against a shoulder 55 thereon is a coil tensioning spring 56 which regulates the automatic action of the governor to determine the period of the shift of the valve 31 under the velocity of speed of rotation of the propeller. This spring 56 is for the higher speed action of the governor and the said spring can be set to vary the action of the governor in the higher speeds of rotation of the propeller through the medium of a regulating disk 57 acted upon by a set screw 58 mounted in a part of the stuffing box 33. In other words, the spring 56 can be tensioned so that the governor action will take place at one of the higher speeds or at another higher speed, that is, by changing the tension of such spring.

Ribbed interlocked centrally within the inner end of each blade 17 is a stud 59 carrying a head 60 provided with opposed gear segments 61, these meshing with connector gears 62 upon stud journals 63 engaged in bearings 64 and 65, respectively, in the hub 12, the bearing 65 being adjustable to take up play or thrust and in the working of the gear segments 61 with the gears 62 the blades 17 turn in true unison with each other so that the pitch of one blade cannot be altered without altering the other blade alike thereto.

Carried by the crank case of the engine at the nose end of the aircraft is a housing 66 in which is fitted a manual control which functions to adjust or limit the movement of the automatic governor and includes a movable cam 67 operative on a push ring 68 to which are connected push rods 69, these working through suitable guideways in the hub 12 to act upon the springs 53 for tensioning the same to counteract the action of the spring 56. The cam 67 is operated from a wire plunger 70 encased in a flexible cable 71 and extended into the cockpit of the aircraft in convenient reach of the operator thereof for the manual working of the manual governor control. The housing 66 and the ring 68 are concentrically disposed about the power shaft 10 between the inner end of the hub 12 and the engine case, as will be apparent from Figures 1 and 3 of the drawings.

The collar 25 is of the split or two-part construction and its parts are detachably secured together by fasteners 72.

The cylinders 23 are held fast in the extensions 14 by the keys 73.

In the working of the mechanism the fluid under pressure is admitted through the nozzle or barrel 29 into the cylinders 23, the control of the fluid being had by the valve 31 so that this admitted fluid will work upon the vanes or wings 18 at the inner ends of the blades 17 of the propeller to alter the pitch of said blades, the exhaust of the fluid from the said cylinders 23 being also controlled by the valve 31 for admission into the exhaust chamber 30 and thence through the return 47 to the original source of such fluid. The valve 31 is under the automatic control of the governor and also is under manual control by the cam 67 operated from the wire plunger 70.

In Figure 13 of the drawings there is shown a slight modification of the arrangement of the vanes or wings with respect to the arrangement as shown in Figures 10 and 11 and wherein the inner end of each blade 74 has the internal vanes or wings 75, while the centering stud 76 is formed with the vanes or wings 77 and in this manner the cylinder 23 is eliminated as the centering stud 76 telescopes into the inner end of the blade 74 and the vanes or wings 75 coact with the vanes or wings 77 in this assembly.

With reference to the valve 31, its enlargement 34 has longitudinally therethrough by-passes 38 so that the fluid can pass from one side to the other side of said enlargement 34 during the exhaust or return of the fluid to the fluid source.

In Figures 14 to 16 of the drawings there is shown a further modified form of the mechanism for controlling the pitch of the propeller blades, wherein the hub 79, which supports the blades of the propeller identically to their support by the hub 12, has formed on opposite sides of the axis of rotation of said hub the cylinders 80 in which are arranged pistons 81 having the center stems 82, these slidable through packing glands 83 of end heads 84 detachably mounted and closing the outer ends of said cylinders 80. To each stem 82 is fitted a cross arm 85 which is provided with right-angular ends 86, these being passed through clearances 87 formed in the hub 79 where they are pivotally connected, at 88, with radially disposed ears 89 on the inner end of the propeller blade 90. It is, of course, understood that these arms 85 are diagonally disposed and cross each other with one end 86 of each connected with one blade and the other end connected with the other blade, so that on the movement of the pistons 81 the said blades will be turned in unison with each other for changing the pitch or angular disposition of such blades.

The feed and exhaust of fluid to the cylinders 80 is had by the valve and ball governor mechanism hereinbefore described, it being understood, of course, that in this further modified form the parts 59, 60, 61 and 62 and other adjuncts will have been omitted but that such governor mechanism manually controlled is a part of this further modified form.

It will be seen that in this further modified form the fluid pressure regulates the action of the pistons 81 in the cylinders 80 for altering the pitch of the blades of the propeller and under the actuation of the pistons a wide range of pitch is available, this being also true with the preferred form and other modified forms shown in Figures 1 to 13 of the drawings.

From the foregoing it is thought that the construction and manner of operation of the mechanisms hereinbefore described will be clearly understood and, therefore, a more extended explanation has been omitted for the sake of brevity.

What is claimed is:

1. In a propeller construction, a rotatable hub, blades detachably journaled in the hub for rotation and having radially disposed vanes at their journaled ends and concentric thereof, stationary vanes in the hub and coacting with the radially disposed vanes, a fluid supply through the hub to between the vanes, centrifugal governor controlled means carried by the hub and admitting and exhausting the fluid supply to and from between the vanes for varying the pitch of the blades, a power shaft having the hub fixed thereto, gear connections between the blades for synchronous action therebetween, manually actuated means for varying the operation of the governor controlled means, and a cam acting with the last-named means.

2. In a propeller construction, a hub having tubular extensions at diametrically opposite relation to each other, rotatable blades journaled at their inner ends in said extensions, means detachably coupling the blades with said extensions, impact vanes radially arranged and longitudinally extended on the journaled ends of said blades, vanes companions to the first-named vanes and arranged interiorly of the extensions, a power shaft fixed to said hub and having a fluid inlet passage, an inlet nozzle within the power shaft and leading from said inlet passage, centering portions in the hub and having leads to between the vanes, a slide valve on the nozzle for controlling the admission and exhaust of fluid from the said nozzle to and from the leads in said centering portions, a centrifugal-acting governor carried by the hub and connected with the valve for the automatic control thereof, manually regulated means for varying the automatic action of the governor, and a manually shiftable cam actuating the last-named means.

3. In a propeller construction, a hub having tubular extensions at diametrically opposite relation to each other, rotatable blades journaled at their inner ends in said extensions, means detachably coupling the blades with said extensions, impact vanes radially arranged and longitudinally extended on the journaled ends of said blades, vanes companions to the first-named vanes and arranged interiorly of the extensions, a power shaft fixed to said hub and having a fluid inlet passage, an inlet nozzle within the power shaft and leading from said inlet passage, centering portions in the hub and having leads to between the vanes, a slide valve on the nozzle for controlling the admission and exhaust of fluid from the said nozzle to and from the leads in said centering portions, a centrifugal-acting governor carried by the hub and connected with the valve for the automatic control thereof, manually regulated means for varying the automatic action of the governor, a manually shiftable cam actuating the last-named means, and gear connections between the journaled ends of said blades for unitary action thereof.

4. In mechanism of the character described, a rotary hub, shiftable propeller blades carried by said hub, coacting vanes arranged within the propeller blades and hub, fluid controlling means arranged within the hub for the admission and exhaust of the fluid to and from said vanes for changing the pitch of the blades and cam acting means cooperating with the fluid controlling means.

5. In a propeller construction, a hub, a variable and reversible pitch blade fitting said hub, means confined within the blade and hub for varying and reversing the pitch of said blade, means for regulating fluid to and from the said means and cam acting means cooperating with the last-named means.

6. In a propeller construction, a hub, a variable and reversible pitch blade fitting said hub, means confined within the blade and hub for varying and reversing the pitch of said blade, means for regulating fluid to and from the said means, an automatic governor controlling the last-named means and cam acting means cooperating with the automatic governor.

7. In a propeller construction, a hub, a variable and reversible pitch blade fitting said hub, means confined within the blade and hub for varying and reversing the pitch of said blade, means for regulating fluid to and from the said means, an automatic governor controlling the last-named means, cam acting means cooperating with the automatic governor and fittings detachably connecting the blades with the hub.

8. In mechanism of the character described, a rotary hub, shiftable propeller blades carried by said hub, coacting vanes arranged within the propeller blades and hub, fluid controlling means arranged within the hub for the admission and exhaust of the fluid to and from said vanes for changing the pitch of the blades, and cam acting hand controlled and automatic governors coacting with said means.

9. In mechanism of the character described, a rotary hub, shiftable propeller blades carried by said hub, coacting vanes arranged within the propeller blades and hub, fluid controlling means arranged within the hub for the admission and exhaust of the fluid to and from said vanes for changing the pitch of the blades, hand operated and automatic governors coacting with said means, and means for manually changing the action of the automatic governors.

10. In a propeller construction, a hub, a pitch changing blade carried thereby, fluid actuated vanes arranged within the blade and hub for varying the pitch of said blade, means for regulating fluid to and from said vanes, an automatic governor mechanism controlling the last-named means, and a cam acting manually regulated control associated with said governor mechanism.

JESS W. BACE.